UNITED STATES PATENT OFFICE.

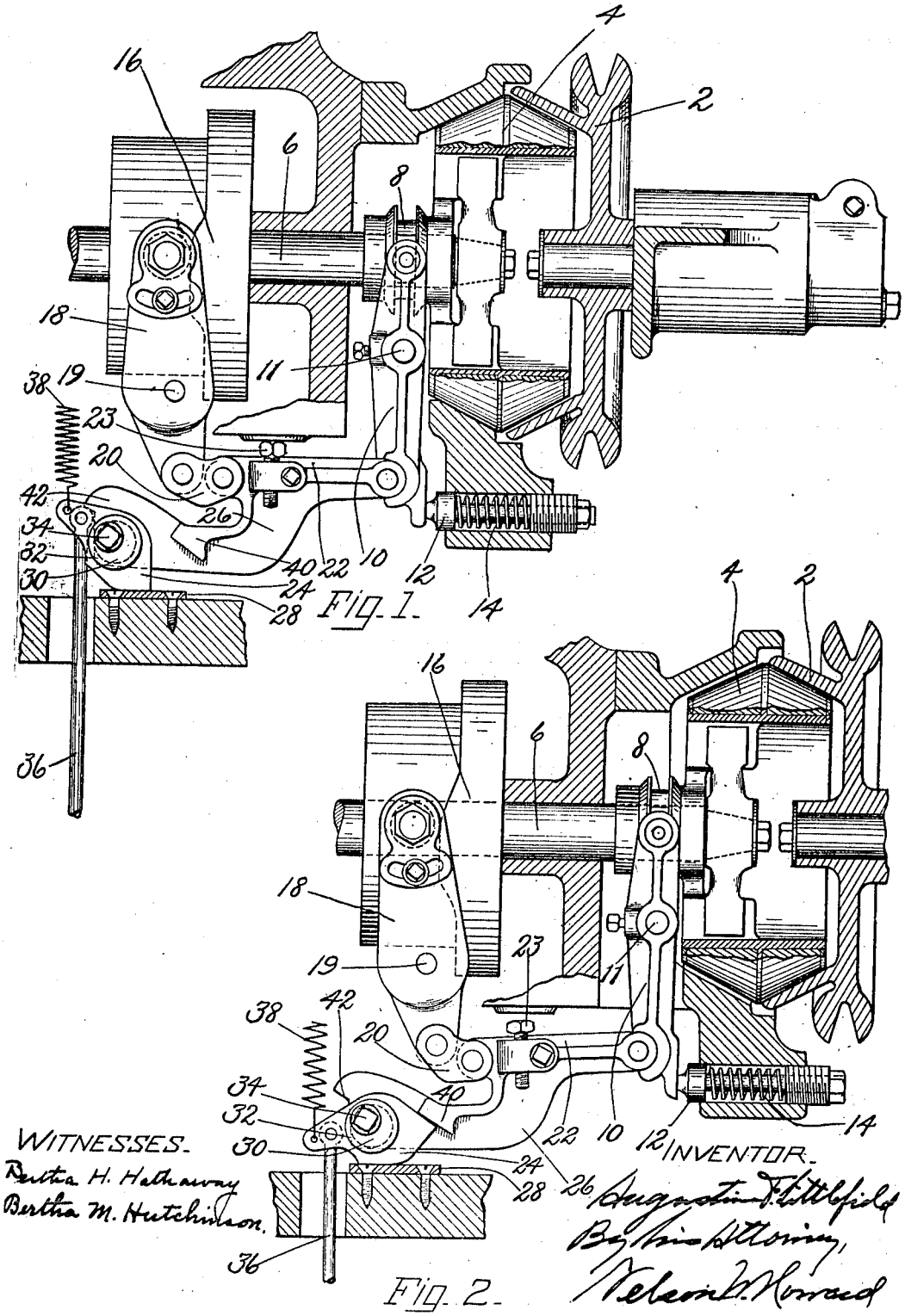

AUGUSTINE F. LITTLEFIELD, OF LYNN, MASSACHUSETTS, ASSIGNOR TO UNITED SHOE MACHINERY COMPANY, OF PATERSON, NEW JERSEY, A CORPORATION OF NEW JERSEY.

STARTING AND STOPPING MECHANISM.

1,048,840.

Specification of Letters Patent. Patented Dec. 31, 1912.

Application filed November 2, 1906. Serial No. 341,738.

*To all whom it may concern:*

Be it known that I, AUGUSTINE F. LITTLEFIELD, a citizen of the United States, residing at Lynn, in the county of Essex and Commonwealth of Massachusetts, have invented certain Improvements in Starting and Stopping Mechanisms, of which the following description, in connection with the accompanying drawings, is a specification, like reference characters on the drawings indicating like parts in the several figures.

This invention relates to starting and stopping mechanisms and pertains more particularly to that type of mechanism wherein a clutch is disengaged, at a predetermined stage in the cycle of operations of a machine, by a clutch-thrower the action of which is communicated to the clutch through appropriate transmission devices. Commonly, a machine employing such mechanism is started by interrupting effective communication through the transmission devices so as to render the action of the clutch-thrower ineffectual, thereby permitting a spring or the like to put the clutch into engaging position; and the machine is stopped by reëstablishing effective communication through the transmission devices so that the next action of the clutch-thrower shall be transmitted to the clutch to disengage it. This type of starting and stopping mechanism is particularly convenient for use in connection with machines which it is desired to stop with their operating parts always in a predetermined position; and in such use it is especially important that the machine be stopped promptly and accurately at the proper time in order to preclude over-running beyond the position desired for the operating parts when they come to rest.

This invention is designed to provide for stopping a machine promptly and accurately, by locking the transmission devices securely in position when effective communication through them to disengage the clutch has been established, thereby preventing a temporary retraction of said devices, frequently experienced in mechanisms heretofore used, which is likely to interrupt communication again and allow the machine to over-run and injure stock which is being operated upon, besides leaving the machine parts in undesired positions. To this end the invention comprises the combination of a clutch, a clutch-thrower and transmission devices, with locking means arranged to lock the transmission devices in position to communicate the action of the clutch-thrower to the clutch.

As herein shown the transmission devices which are interposed between the clutch-thrower and the clutch include two connected links pivoted at their outer ends respectively to the clutch-thrower cam lever and the clutch shifting lever. These links are adapted to be locked rigidly in an effective transmitting position in which they are either in substantial alinement or in which they are held in a slightly unalined or broken position. For reasons which will be pointed out hereafter the latter arrangement of the transmission links is to be preferred in most cases. When it is desired to interrupt the effective communication through the transmission pieces or links they are unlocked and permitted to move, or are moved, farther out of alinement with each other.

That feature of the invention which consists in utilizing pivoted transmission pieces held in an unalined position is of much importance in that only movement of slight extent and the application of little pressure are required to move these pieces from their slightly unalined transmitting position into ineffective condition. This facilitates ready starting and stopping of the machine with little effort on the operator's part which is most desirable, especially in eyeleting machines or the like which must be started and stopped a great number of times in a day's run.

One type of starting and stopping mechanism which has been used heretofore is well illustrated in Letters Patent of the United States, No. 672,056, dated April 16, 1901, and the present invention will be described, for convenience, as embodied in mechanism employing a clutch and clutch-thrower similar to those shown in said patent. Nothing herein contained is to be construed, however, as limiting this invention, in its application, to use in connection with devices shown in said patent or with devices of like character, since the following detailed description relating to such devices treats of a preferred construction which is used for purposes of exemplification only.

In the accompanying drawings, Figure 1 is a side elevation, partly in section, of a clutch and associated parts embodying this invention with the transmission devices locked in effective position and the clutch disengaged. Fig. 2 is a side elevation similar to Fig. 1 showing the transmission devices unlocked and the clutch engaged for driving a shaft.

The specific devices shown in the drawings comprise a clutch, a device for putting the clutch into engaging position, a clutch-thrower, transmission devices, a lock and a controller. The clutch consists of a belt-driven pulley 2 and a friction member 4. The friction member is axially movable on a shaft 6 which may be conveniently the driving shaft of the machine and is adapted to rotate only with said shaft. The friction member has two oppositely disposed frusto-conical friction surfaces, one of which, when the clutch is in engaging position, fits into a correspondingly shaped concave friction surface on the pulley 2, and the other of which contacts, when the clutch is disengaged, with a rigid friction surface on the frame of the machine which serves as a brake to arrest the rotation of the friction member and shaft. The friction member is moved back and forth axially on the shaft through a collar 8 rigid with the friction member and a shifting arm 10 pivoted at 11 and engaged with said collar. A plunger 12 mounted in a recess in the frame of the machine is urged forward by a spring 14 so that the plunger is kept in contact with the lower end of the shifting arm. When unimpeded, said spring holds the shifting arm in position to cause the clutch to engage, that is to cause the friction member to engage the pulley 2. The action of said spring is opposed so as to move the shifting arm for disengaging the clutch through the agency of a clutch-thrower cam 16 on the shaft 6 and a cam lever 18 pivoted at 19. The above described devices are substantially similar to corresponding parts shown in the patent previously referred to and for further understanding of said devices and their operation, reference may be had to said patent.

The action of the clutch-thrower 16 is communicated to the friction member 4 through transmission devices comprising the cam lever 18, a toggle link 20, a second toggle link 22, and the shifting arm 10. When the toggle links are held in alinement or in a slightly unalined position, effective communication is established between the clutch-thrower and the clutch so that the cam 16 will act at the proper time to disengage the clutch, but when the toggle is broken to an appreciable extent, effective communication is interrupted and until the toggle links are again brought into substantial alinement the spring 14 will hold the clutch in engagement to drive the shaft. The toggle link 20 is pivoted to the lower end of the cam lever and the toggle link 22 is pivoted to the lower end of the shifting arm. A machine driven by the shaft 6 is stopped by moving the toggle links into substantial alinement so that the cam 16 may act to disengage the clutch through the rigid arm, thus constituted by the links. If the toggle links are not held firmly at this time the impact of the cam 16 against the lever 18 is liable to break the toggle and permit the machine to over-run. In order to prevent this defect and to maintain effective communication between the cam 16 and the clutch, a lock is provided for the transmission devices. As shown in the drawings, a lock 24 is pivotally connected to a finger 26 which is formed as a rigid extension of the toggle link 22. The lock coöperates with a plate 28 which may be conveniently mounted upon the bench which supports the machine. The lock is so arranged that when it is in upright locking position, as shown in Fig. 1, it will bear against the plate 28 and hold the toggle links 20 and 22 rigidly in substantial alinement. When it is moved out of locking position by turning it on its pivot, as shown in Fig. 2, the toggle may be readily broken whereupon the spring 14 will shift the arm 10 to put the clutch into engaging position. In order to provide for adjustment of the lock 24, said lock is rotatably mounted on an eccentric sleeve 30 having a head 32. A bolt 34 extends through said sleeve and is threaded into the end of the finger 26. By loosening the bolt the sleeve may be turned by means of its head so as to adjust the position of the lock relatively to the finger.

It is desirable to provide means for rendering effective and breaking the toggle and also for locking and unlocking the transmission devices. For these purposes a preferred form of controller is shown comprising a treadle-rod 36 and an elevating spring 38 connected to the lock and to a convenient portion of the frame of the machine. This controller governs both the transmission devices and the lock. The upper end of the treadle-rod 36 is attached to the upper end of the lock so that when said rod is depressed the lock will be rotated on the sleeve 30 from the locking position shown in Fig. 1 to the unlocking position shown in Fig. 2.

The curved locking face of the lock is eccentric to its pivot and it is evident that as the lock is turned, a portion having constantly a decreasing dimension is interposed between its pivot and the plate 28. The link 22 carries an adjustable stop 23, which abuts against the frame when the toggle links are in locked position. This stop may be set so that when the links are in locked position, the pivot joining the two links will be slightly below the other pivots of the toggle. When the stop is thus set, as soon as the lock is turned toward unlocking position, the spring 14 causes the toggle to be further broken and the shifting arm 10 operated. If desired the stop 23 may be set so as to bring the pivot joining the two links farther up, in which case the toggle links will remain in locked position until unlocked. A stop 40 projects from the finger 26 so that when the lock has been rotated from locking position the lower rear portion thereof abuts against said stop thereby constituting of the finger and lock a temporary rigid lever upon which the treadle-rod 36 acts to break the toggle. When the finger and lock have been depressed far enough to break the toggle the spring 14 will operate the shifting arm 10 as shown in Fig. 2. When the treadle-rod is released the elevating spring 38 elevates the rod and rotates the lock 24 toward its locking position. A stop 42 is provided on the end of the finger 26 with which the upper end of the treadle-rod engages to limit its upward movement. As the lock is rotated its lower end contacts with the plate 28 and thereupon the point of contact becomes a traveling fulcrum upon which the lock 24 turns to move the toggle links into alinement. This fulcrum travels along the curved locking face of the lock which is arranged eccentrically to its pivot so that the rotation of the lock about said pivot will move the point of contact with the plate gradually farther from said pivot. In this manner the toggle links are rendered effective automatically through the action of the spring 38 when the treadle is released. When said links have been brought into substantial alinement, further motion is arrested by the stop 23 and at this time the lock is rigidly interposed between the toggle and the plate 28 so as to prevent the toggle being broken by any means until the lock has been turned again from its locking position by depressing the treadle-rod.

Having described my invention, what I claim as new and desire to secure by Letters Patent of the United States is:—

1. Starting and stopping mechanism having, in combination, a clutch; means for engaging the clutch; a clutch-thrower; transmission devices for communicating the action of the clutch-thrower to the clutch; a controller for establishing and interrupting effective communication through the transmission devices; and locking means which lock the transmission devices when the controller has established effective communication through them.

2. Starting and stopping mechanism having, in combination, a clutch; means for engaging the clutch; a clutch-thrower for disengaging the clutch; transmission devices for communicating the action of the clutch-thrower to the clutch; a controller for establishing and interrupting effective communication through the transmission devices; and a lock which coöperates with said controller to lock the transmission devices when effective communication has been established through them.

3. Starting and stopping mechanism having, in combination, a clutch; clutch-engaging means; a clutch-thrower; transmission devices; locking-means for automatically locking the transmission devices in effective position, said locking means being at all times in operative relation with said transmission devices; and means for unlocking the transmission devices.

4. Starting and stopping mechanism having, in combination, a clutch; means for engaging the clutch; a clutch-thrower for disengaging the clutch; transmission devices between said clutch and said clutch thrower; a controller for establishing and interrupting effective communication through the transmission devices; and a lock for the transmission devices operated by the controller.

5. Starting and stopping mechanism having, in combination, a clutch having a movable member; means for moving said member in one direction; a clutch-thrower for moving said member in the opposite direction; transmission devices for communicating the action of the clutch-thrower to said movable member; and a lock for the transmission devices, said lock being at all times in operative relation with said transmission devices.

6. Starting and stopping mechanism having, in combination, a clutch; means for engaging said clutch; a clutch-thrower for disengaging said clutch; transmission devices, including a toggle, for communicating the action of the clutch-thrower to the clutch; a controller for establishing and interrupting effective communication through the transmission devices; and a lock for the transmission devices.

7. Starting and stopping mechanism having, in combination, a clutch; means for engaging the clutch; a clutch-thrower for disengaging the clutch; transmission devices including a toggle; a controller for establishing and interrupting effective communication through the transmission devices; and locking means arranged to lock said toggle in effective condition.

8. Starting and stopping mechanism having, in combination, a clutch; means for engaging the clutch; a clutch-thrower for disengaging the clutch; transmission devices including a toggle; and a controller which moves the links of said toggle in opposite directions for respectively establishing and interrupting effective communication through the transmission devices; and locking means arranged to lock the toggle when effective communication has been established.

9. Starting and stopping mechanism having, in combination, a clutch; means for engaging the clutch; a clutch-thrower for disengaging the clutch; transmission devices including a toggle; locking means arranged to lock said toggle in effective condition; and a controller for establishing and interrupting effective communication through the transmission devices, said controller being arranged to operate said locking means.

10. Starting and stopping mechanism having, in combination, a clutch; means for engaging the clutch; a clutch-thrower for disengaging the clutch; transmission devices including a toggle; a rotatable lock associated with said toggle and arranged to lock said toggle in effective condition; and a controller arranged to operate said lock.

11. Starting and stopping mechanism having, in combination, a clutch; clutch-engaging means; a clutch-thrower for disengaging the clutch; transmission devices for communicating the action of the clutch-thrower to the clutch; a movable lock arranged to be moved out of locking position when communication through the transmission devices is interrupted; and means for moving said lock into locking position and establishing communication through the transmission devices.

12. Starting and stopping mechanism having, in combination, a clutch; means for engaging the clutch; a clutch-thrower for disengaging the clutch; transmission devices including a toggle; a rigid finger carried by a link of said toggle; a movable lock, carried by said finger, arranged to lock said toggle when its parts occupy a predetermined effective relation; means for moving said lock out of locking position and at the same time breaking said toggle; and means for moving said lock into locking position and at the same time moving the parts of the toggle into said predetermined effective relation.

13. Starting and stopping mechanism having, in combination, a clutch; means for engaging the clutch; a clutch-thrower for disengaging the clutch; transmission devices for communicating the action of the clutch-thrower to the clutch; a lock for the transmission devices; a support upon which said lock is movably mounted; and means for causing said lock and support to act as a rigid lever to interrupt effective communication through the transmission devices.

14. Starting and stopping mechanism having, in combination, a clutch; means for engaging the clutch; a clutch-thrower for disengaging the clutch; transmission devices including a toggle; a rigid finger carried by a link of said toggle; a movable lock, carried by said finger, arranged to lock said toggle when it is alined; means for moving said lock out of locking position; and means for causing said lock and finger to act as a rigid lever to break the toggle.

15. Starting and stopping mechanism having in combination a clutch, a clutch thrower, and a transmission device for transmitting motion from the clutch thrower to the clutch, said transmission device comprising members arranged to be moved by the operator into an angular relation to each other and means which may be adjusted for alining said members and positively maintaining such alinement.

16. Starting and stopping mechanism having, in combination, a clutch, a clutch thrower, a transmission device including toggle links located intermediate of said clutch thrower and clutch, and an adjustably mounted lock arranged to lock said toggle in effective condition.

17. Starting and stopping mechanism having, in combination, a clutch; means tending normally to engage the clutch; an intermittently acting cam for throwing the clutch; links interposed between said cam and clutch, one of said links being so arranged as to receive at all times the intermittent motion from said cam; means under the control of the operator for arranging said links so that the motion of the cam shall be effective to overcome the action of the clutch engaging means; and a locking device for preventing disarrangement of said links.

18. Mechanism of the class described having, in combination, an automatically acting clutch thrower, a clutch, transmission devices arranged between the clutch thrower and clutch, a lock for holding said devices in effective condition, and a treadle rod arranged to act upon the lock first to unlock the transmission devices and then positively to move the transmission devices into ineffective position.

19. Starting and stopping mechanism having, in combination, a clutch, clutch-engaging means, a clutch-thrower, transmission means including a toggle, and means for locking said toggle in a broken condition to transmit the action of the clutch-thrower to the clutch.

20. Starting and stopping mechanism having, in combination, a clutch, a clutch-thrower, and transmission means between said clutch-thrower and clutch including toggle links held rigidly in a broken condition.

21. Starting and stopping mechanism having in combination, a clutch, a clutch-thrower, transmission means between said clutch-thrower and clutch including toggle links, and means for holding said toggle links in a broken condition to transmit the action of the clutch-thrower to the clutch.

22. Starting and stopping mechanism having, in combination, a clutch, a clutch-thrower, transmission means including pivoted pieces, means for holding said pieces in an unalined condition to transmit the action of the clutch-thrower to the clutch, and means for moving the pieces into a further unalined-position to interrupt the effective communication through the transmission means.

23. Starting and stopping mechanism having, in combination, a clutch, a clutch-thrower, transmission means including pivoted pieces, and means acting at all times to prevent said pivoted pieces from being brought into alinement.

24. Starting and stopping mechanism having, in combination, a clutch, a clutch-thrower, transmission means including pivoted pieces, means acting at all times to prevent said pivoted pieces from being brought into alinement, and means for interrupting the effective communication through the transmission pieces.

25. Mechanism of the class described having, in combination, an oscillatory cam lever, a clutch shifting lever, toggle links extending between said levers, said links being held in a broken condition to transmit the motion of one lever to the other, and yielding means subjecting said links to endwise pressure and tending, when the links are released, to break the toggle links still further and move the clutch shifting lever.

26. Starting and stopping mechanism having, in combination, a clutch, a clutch-thrower, transmission pieces between said clutch-thrower and clutch held rigidly in unalined condition to transmit movement from the clutch-thrower to the clutch, manually operated means for interrupting effective communication through said pieces, and automatic means for returning said pieces to their transmitting condition.

In testimony whereofy I have signed my name to this specification in the presence of two subscribing witnesses.

AUGUSTINE F. LITTLEFIELD.

Witnesses:
 JOHN H. RUCKMAN,
 FREDERICK L. EDMANDS.

---

Copies of this patent may be obtained for five cents each, by addressing the "Commissioner of Patents, Washington, D. C."